United States Patent Office 3,220,984
Patented Nov. 30, 1965

3,220,984
AMINE CROSS LINKED SULFONE POLYMERS
AND PROCESS THEREFOR
Irving Tashlick, 1310 Bay St., Springfield, Mass., and
Harry M. Culbertson, 18571 Blythswood Drive, Los
Gatos, Calif.
No Drawing. Filed Nov. 14, 1960, Ser. No. 68,594
10 Claims. (Cl. 260—79.3)

The present invention is directed to production of sulfone polymers and more particularly to cross-linked polymers of this type.

Sulfone or sulfonyl polymers are those which contain

groups in the polymer backbone. As a class, they are generally known. Of the sulfone polymers presently known, those of particular interest are those obtained from reacting stoichiometric equivalents of a donor compound represented by the formula:

$$H—Z—R—Z—H$$

with an acceptor compound represented by the formula:

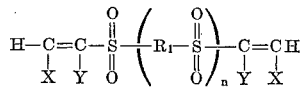

The sulfone polymers so obtained are linear in nature and can be represented by the formula:

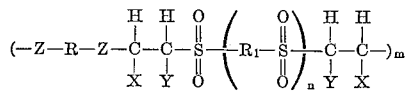

Throughout the representation used, R designates a divalent organic radical, $R_1$ a divalent aliphatic radical free of functional groups, X and Y radicals selected from the class consisting of hydrogen, alkyl and aryl radicals, Z designates a component selected from the class consisting of oxygen and sulfur and $m$ is an integer designating the number of repeating polymer units and $n$ is 0 or 1. The linear polymers so produced are thermoplastic in nature. They have utility as molding compositions, films, fibers, etc. However, in that they do not readily cross-link, they will not exhibit solvent and heat resistance.

Accordingly, it is a principal object of the present invention to produce readily cross-linkable sulfone polymers.

Another object is to produce cross-linked or thermoset sulfone polymers.

Another object is that of obtaining sulfone polymers exhibiting improved properties of solvent and heat resistance, as well as dimensional stability.

Other objects of the invention will in part be obvious and will in part appear hereinafter.

These and other objects of the present invention can be attained through practice of a process which comprises the steps of (A) forming a cross-linkable pre-polymer mixture, the sulfone polymer molecules of which contain at least two vinyl sulfone groups, by reacting a sulfone starting material or acceptor component selected from the class consisting of monosulfones represented by the formula:

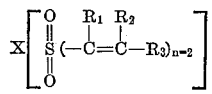

and polysulfones represented by the formula:

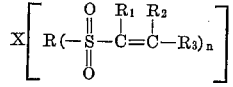

with less than a stoichiometric quantity of an active hydrogen-containing compound or donor component selected from the class consisting of polyhydric alcohols, polyhydric thiols and monosubstituted amines represented by the formula:

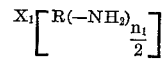

and amines represented by the formula:

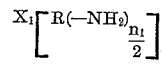

the said quantiyt being such that the ratio of $n.X$ to $n_1.X_1$ is greater than unity $$\left(\frac{nX}{n_1X_1}>1\right)$$

and wherein $n$ and $n_1$ represent integers of at least 2 and X and $X_1$ represent numbers of moles of each reactant and thereafter (B) cross-linking the said sulfone pre-polymer mixture to provide a thermoset polymer by reacting the same with an amine selected from the class consisting of primary and secondary amines having at least two amino-hydrogens except that when the number of vinyl sulfone groups contained in the said pre-polymer are two in number, the amine must contain more than two amino-hydrogens and wherein throughout the said process R is selected from the class consisting of organic radicals having a valence of 2–6 and free of reactive functional groups $R_1$, $R_2$ and $R_3$ are selected from the class consisting of hydrogen, alkyl and aryl radicals, and Z is selected from the class consisting of monosubstituted nitrogen, oxygen and sulfur.

The following examples are entered in illustration of the invention. Where parts are mentioned, parts by weight are intended unless otherwise described.

EXAMPLE I

A. *Pre-polymer preparation*

Two solutions, the first constituted of 21.27 g. (0.18 mole) divinyl sulfone dissolved in 15 ml. of 1,2-dimethoxyethane and the second 9.55 g. (0.09 mole) diethylene glycol and 2.76 (0.03 mole) glycerin dissolved in 20 ml. 1,2 - dimethoxyethane are prepared under essentially anhydrous conditions. About 5 ml. of the glycol solution is first reacted with 0.02 g. of sodium hydride and the reaction product which serves as a basic catalyst is slowly added to the divinyl sulfone solution. The remainder of the glycol solution is added over a period of 30 minutes. The reaction is exothermic in nature and the temperature is maintained between 30°–40° C. by cooling. After addition is complete, the resulting solution is maintained under stirring for an hour. Thereafter 4 drops of acetic acid plus a few crystals of hydroquinone are added to stabilize the resulting resin against further reaction. At that point, the remaining solvent is removed under a vacuum of 30 mm. Hg at 40° C. The residue which remains is a light yellow viscous oil which absorbs about 20% by weight of water, is soluble in acetone, and insoluble in dioxane, benzene, ethanol, and tetrahydrofuran. When the IR spectrum of the pre-polymer is compared to that for the unreacted starting mixture, it evidences marked reduction in hydroxyl group absorption, strong absorption due to new ether linkages and retention of some vinyl linkages. The pre-polymer resin contains molecules calculated to have a molecular weight of about 1,100 and three vinyl sulfone groups.

B. Cross-linking step (1) Eleven grams of the pre-polymer product above is intimately mixed with 0.62 g. (.006 mole) of diethylene triamine. The mixture warms and sets up to a firm, light-colored gel which does not flow at room temperature. On being allowed to stand at room temperature for 12 hours, the material becomes a rubbery solid, which will not flow when heated to 250° C. When immersed in acetone for 12 hours, this material is slightly swollen, but remains undissolved, attesting to its thermoset condition.

(2) A 5.5 gram sample of the pre-polymer resin is mixed with 0.65 g. (.0074 mole) of piperazine. A slight exothermic reaction results. The mixture which has now become tacky is spread onto the surface of a 3 mil thick rubber sheet and a backing material of cotton duck is superimposed over the same. The assembly is placed in a sheet press and cured for 30 minutes at 70° C. The laminate which results is flexible, and the films cannot be separated when subjected to ordinary tearing forces, and neither is the adhesive bond provided by the sulfone polymer affected by boiling water or acetone.

EXAMPLE II

A. Pre-polymer preparation

A solution of 0.015 (0.000625 mole) of sodium hydride dissolved in 16.22 g. (0.18 mole) of 1,4 butanediol is prepared. This solution is added slowly to a stirred flask containing 28.36 g. (0.24 mole) divinyl sulfone. After the addition of 5–7 ml. of the 1,4-butanediol solution there is a rapid rise in temperature from 24° C. to 90° C. The addition of 1,4-butanediol solution is continued under stirring at a rate designed to maintain the temperature between 70° C. and 90° C. When addition is complete, the reaction mixture is heated to 120° C. and held at that temperature for 2 hours. The mixture is then cooled to room temperature, and is observed to be a light yellow to colorless viscous resin syrup which can be poured at room temperature.

An analysis of the hydroxyl content of the pre-polymer mixture by acetylation with acetic anhydride in pyridine shows that 95% of the hydroxyl groups originally present have been reacted. From this, the average molecular weight of the pre-polymer molecules is calculated to be about 700 and contain two vinyl sulfone groups. When tested by IR spectrum analysis the presence of free vinyl groups and ether linkages is evidenced.

B. Cross-linking step (1) A 3.71 g. sample of the pre-polymer above is mixed with 0.29 g. (.0025 mole) of 1,6-hexamethylene diamine. There is a mild exothermic reaction on mixing. On standing for 10 hours at room temperature, the product remains a stiff rubbery mass which can be cured to an elastomeric solid by heating at 70° C. for 5 minutes. The cured solid has a $T_{(g)}$ of −4° C.

(2) The cross-linking step of B (1) above is repeated except that 0.2 g. of acetic acid is added in the original mixing. The curing time is considerably slowed down in that the material remains soft, tacky and hazy after 10 hours at room temperature. After curing for 2 hours at 70° C. an elastomeric solid having similar properties to those of the solid obtained in B (1) above is obtained.

EXAMPLE III

A. Pre-polymer preparation

A solution of 0.015 g. (0.000625 mole) sodium hydride dissolved in 13.42 g. (0.10 mole) of 1,2,6-hexanetriol is prepared and is then slowly added to a stirred flask containing 29.54 g. (0.25 mole) of divinyl sulfone. After the addition of a few moles, an orange color appears followed by a sharp rise in temperature from 25° C. to 80° C. The reaction mixture then becomes colorless and addition is completed while maintaining the temperature between 65–100° C. The colorless syrup is stirred at 120° C. for 2 hours and cooled to give a clear, colorless, tacky syrup which flows stiffly at room temperature.

Acetylation values of the syrup with acetic anhydride in pyridine indicate that 88% of the hydroxyl group orginally present have been reacted. When tested by IR spectrum analysis the presence of free vinyl groups and ether linkages is noted. The pre-polymer molecules are calculated to have more than two vinyl sulfone groups.

B. Cross-linking step

A 17.29 portion of the pre-polymer product is stirred with 2.16 g. (.02 mole) of p-phenylenediamine and 1.5 g. of acetic acid. A hazy liquid results. The liquid is poured into a mold and cured for 6 hours at 160° C. to give a dark-colored, solid casting having a $T_{(g)}$ of 40° C. The material shows excellent adhesion to glass.

EXAMPLE IV

A. Pre-polymer preparation

A solution of 0.08 g. (0.0007 mole) of potassium tertiary butoxide dissolved in 17.31 g. (0.16 mole) 1,3-propanedithiol is slowly added to a stirred flask containing 23.63 g. (0.20 mole) of divinyl sulfone. After the addition of a few ml. of the dithiol solution the temperature rises slowly. Addition is continued over a period of about 1 hour and then the reaction mixture is heated to 100° C. and held at this temperature for an hour. On cooling, the product is a viscous oil.

The pre-polymer is tested to assess the percentage of thiol groups reacted by titration with silver nitrate. The results show 98% of these groups reacted. IR spectrum analysis confirms the presence of vinyl groups. The number of vinyl sulfone groups per pre-polymer molecule is calculated at two.

B. Cross-linking step

A 5.15 g. portion of the pre-polymer resin is stirred with 0.34 g. (.0025 mole) of m-xylylene diamine. The mixture remains cool while stirring and is then cast onto a glass plate. After curing for 8 hours at 160° C. a rubbery continuous film results which remains adhered to the glass when immersed in acetone for a period of 12 hours.

EXAMPLE V

A. Pre-polymer preparation

A solution of 15.54 g. (0.18 mole) piperazine dissolved in 75 ml. warm dioxane, is slowly added with stirring to 28.36 g. (0.24 mole) of divinyl sulfone. An exothermic reaction results on addition, and after addition is completed the reaction mixture is refluxed for 1 hour at atmospheric pressure. On evaporation of the solvent, a viscous liquid remains. When the IR spectrum of this liquid is taken the (a) presence of free vinyl groups and (b) virtual absence of secondary amine groups is noted. The molecular weight can be calculated as about 730. The number of vinyl sulfone groups per pre-polymer molecule is calculated to be two.

B. Cross-linking step

A 7.3 gram portion of the pre-polymer resin above together with 0.72 g. (.005 mole) of 1,4-bis(aminomethyl)cyclohexane is dissolved in 30 ml. of dry acetone. The liquid is then cast as a film onto the surface of a polished metal plate and allowed to dry at room temperature for a period of 12 hours. This assembly is placed in a circulating air oven and heated for two hours at 160° C. A clear, continuous film results which resists the action of (a) boiling water and (b) acetone when immersed in each for 60 minutes.

EXAMPLE VI

A. Pre-polymer preparation

A mixture consisting of 15.01 g. (0.10 mole) of triethylene glycol and 66.8 g. (0.20 mole) 4,4'-di(vinylsulfonyl)diphenyl is added to 200 ml. of dimethoxyethane and heated to boiling. The reaction mixture is cooled to 40° C. and 1 ml. of a 10% solution of potassium tertiary butoxide in tetrahydrofuran is added with vigorous stirring to give an exothermic reaction. The solution which results is heated to reflux and so maintained for 2 hours. On evaporation of the solvent, an extremely viscous liquid is isolated which solidifies to a low melting solid on standing for a week.

When subjected to IR spectrum analysis, the liquid resin product evidences (a) the presence of free vinyl groups and (b) an increase in ether linkages over those evidenced in the starting materials. Acetylation values of the liquid product by the acetic acid and pyridine method indicates that 8% of the hydroxyl groups remain unreacted. The number of vinyl sulfone groups retained in the pre-polymer molecules is calculated as two.

B. Cross-linking step

A 4.1 g. portion of the pre-polymer resin is rapidly mixed with 0.3 g. (.0016 mole) of tetraethylene pentamine. The mixture warms indicating the occurrence of a slight exothermic reaction, and within 60 minutes the mix sets to a solid mass which is infusible up to the point of decomposition, indicating that extensive cross-linking has taken place.

EXAMPLE VII

A. Pre-polymer preparation n-Amyl amine in the amount of 1.74 g. (0.02 mole) is added to a mixture of 9 g. (0.03 mole) of 2,4-di(propenylsulfonyl) toluene in 60 ml. of dioxane maintained at room temperature. This is paralleled by a rise in temperature up to 40° C. After addition is complete, the reaction mixture is refluxed for 60 minutes. Thereafter solvent is evaporated at 30 mm. Hg and 50° C. The residue which remains is an extremely viscous amber liquid resin product which shows free olefin groups, and a trace of unreacted amino hydrogen. The molecular weight of the product is about 1000.

B. Cross-linking step

A 5.0 g. portion of the resin produced above, is mixed with 0.29 (.0027 mole) of 1,3-propane diamine in a bar mold. A rapid exothermic reaction results. Within 30 minutes a soft solid is obtained, which, after 5 hours becomes a firm solid. The bar, on removal from the mold, resists attack by boiling acetone, and, remains infusible to the point of decomposition.

The present invention is directed to a two-step process by which to produce thermoset sulfone polymers. In the first step, a cross-linkable pre-polymer mixture is produced which contains at least two vinyl sulfone groups in the molecules thereof. This is followed by the second step in which the pre-polymer is cross-linked to produce the desired thermoset sulfone polymers.

More particularly, the process of the present invention constitutes (A) forming a cross-linkable pre-polymer mixture, the sulfone polymer molecules of which contain at least 2 vinyl sulfone groups in the said molecules, by reacting a sulfone starting material or acceptor component selected from the class consisting of monosulfones represented by the formula:

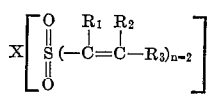

and polysulfones represented by the formula:

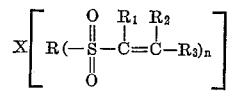

with less than a stoichiometric quantity of an active hydrogen-containing compound or donor component selected from the class consisting of polyhydric alcohols, polyhydric thiols and mono-substituted amines represented by the formula:

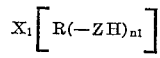

and amines represented by the formula:

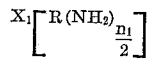

the said quantity being such that the ratio of $n.X$ to $n_1.X_1$ is greater than unity $$\left(\frac{nX}{n_1X_1} > 1\right)$$

and wherein $n$ and $n_1$ represent integers of at least 2 and $X$ and $X_1$ represent numbers of moles of each reactant and thereafter (B) cross-linking the said sulfone pre-polymer mixture by reacting the same with an amine selected from the class consisting of primary and secondary amines having at least two amino-hydrogens, except that when the number of vinyl sulfone groups contained in the molecule of the said pre-polymer are two in number, the amine must contain more than two amino-hydrogens, and, wherein throughout the said process R is selected from the class consisting of organic radicals having a valence of 2–6 and free of reactive functional groups, $R_1$, $R_2$ and $R_3$ are selected from the class consisting of hydrogen, alkyl and aryl radicals, and Z is selected from the class consisting of monosubstituted nitrogen, oxygen and sulfur.

A. Discussion of step A directed to the production of a cross-linkable sulfone pre-polymer The sulfone starting material, or acceptor compounds used in production of the pre-polymer contains a sulfone group

group or groups adjacent to terminal ethylenic

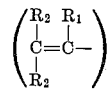

groups, where $R_1$, $R_2$ and $R_3$ are selected from the class consisting of hydrogen, alkyl and aryl radicals. The first of these materials are the monosulfones which can be represented by the formula:

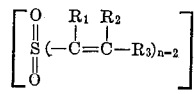

wherein $R_1$, $R_2$ and $R_3$ are selected from the class consisting of hydrogen, alkyl and aryl groups. In the case of monosulfones, then a single sulfone group separates two terminal ethylenic groups. Specific examples of the monosulfones include divinyl sulfone, propenyl sulfone, isopropenyl sulfone, (alpha-ethyl vinyl)sulfone, (alpha-n-propyl vinyl)sulfone, 1-butenyl sulfone, (alpha-phenyl vinyl)sulfone, styryl sulfone, etc. The polysulfone starting materials can be represented by the formula:

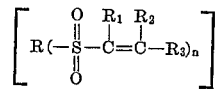

wherein R is selected from the class consisting of organic radicals having a valence of 2-6 and free of functional groups, $R_1$, $R_2$ and $R_3$ are selected from the class consisting of hydrogen, alkyl and aryl groups and $n$ represents an integer of at least 2. The polysulfone starting materials then contain more than one sulfone group. Specific examples of the polysulfone starting materials include 1,4-bis(vinyl sulfonyl)butane, bis(beta,beta'-vinyl sulfonyl)ethyl ether, 4,4'-di(vinyl sulfonyl)diphenyl, 2,4,6-tri(vinyl sulfonyl)toluene, 2,2',4,4'-tetra(vinyl sulfonyl)diphenyl, 1,2-di(vinyl sulfonyl methoxy)ethane, etc.

The active hydrogen-containing compound or donor component which is reacted with the acceptor compound in order to produce the pre-polymer can be selected from the class consisting of polyhydric alcohols, polyhydric thiols and mono-substituted amines represented by the formula:

$$\left[R(-ZH)_{n_1}\right]$$

and amines represented by the formula:

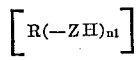

Specific donor compounds include within the polyhydric alcohols: ethylene glycol, 2,3-butylene glycol, 1,4-butanediol, diethylene glycol, tetramethylene glycol, decamethylene glycol, glycerine, hydroquinone, resorcinol, catechol, 4,4'-dihydroxy diphenylmethane, phloroglucinol, 1,2,6-hexanetriol, trimethylol nitromethane, bis-(beta-hydroxyethyl)adipamide; polythiols such as: bis-(beta-mercaptoethyl)adipate, ethylene dithiol, trimethylene dithiol, decamethylene dithiol, bis-(2-thioethyl)ether, 2-thioethanol, thiodiglycol, bis-(beta-hydroxyethyl)sulfoxide, bis-(beta hydroxyethyl)sulfone; as well as mono-substituted amines such as: 1,6-hexamethylene diamine, p-xylylene diamine, 1,3-propane diamine, p-phenylene diamine; and amines represented specifically by: piperazine, tetraethylene triamine, N,N'-diethylphenylene diamine, N,N'-dimethylethylene diamine, and mixtures of the same.

In the formation of the pre-polymer, the acceptor component is reacted with less than a stoichiometric quantity of donor component. In this manner, the pre-polymer molecules which result from the reaction will contain at least two vinyl sulfone groups. With the occurrence of side chains on the pre-polymer molecules the number of vinyl sulfone groups can be greater than two in number.

The prescribed reactions can be illustrated relative to specific instances. First, in relation to a monosulfone starting material:

5CH$_2$=CH—SO$_2$—CH=CH$_2$ + 4HO—CH$_2$—CH$_2$—OH ⟶

Divinyl sulfone       Ethylene glycol

CH$_2$=CH—SO$_2$[—CH$_2$—CH$_2$O—CH$_2$CH$_2$—O—CH$_2$—CH$_2$—SO$_2$-]$_4$CH=CH$_2$

Sulfone pre-polymer

Then with respect to a polysulfone starting material:

These specific instances can be represented then in a generic fashion. Taking the first instance above, and assigning the values there as follows $X=5$, $n=2$, $X_1=4$ and $n_1=2$ then the ratio $$\frac{nX}{n_1X_1}=\frac{10}{8}>1$$

The generic reproduction for the reaction then is as follows:

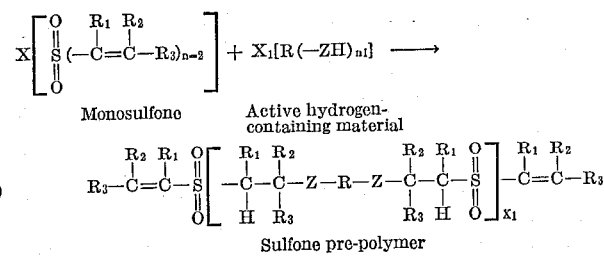

Monosulfone      Active hydrogen-containing material

Sulfone pre-polymer

In similar fashion with respect to the reaction of the polysulfone above, the values for $X=2$, $n=2$, $X_1=1$ and the $n_2=2$ and the ratio $$\frac{nX}{n_1X_1}=\frac{4}{2}>1$$

This reaction can be generically represented as:

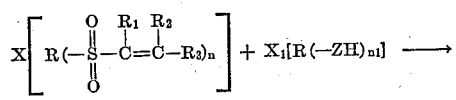

Polysulfone      Active hydrogen contributing material

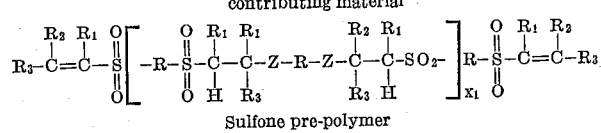

Sulfone pre-polymer

Througout the generic representation above, R represents an organic radical having a valence of 2-6 and free of reactive functional groups, $R_1$, $R_2$ and $R_3$ represents either hydrogen, alkyl or aryl radical, Z represents mono-substituted nitrogen, oxygen or sulfur, $n$ and $n_1$ represent integers of at least 2 and X and $X_1$ represent numbers of moles of the sulfone starting material and active hydrogen contributing compound, respectively.

The pre-polymer formation reaction is carried out as a catalysis reaction. When the donor component is either a polyol or water, a strong base is used. Strong bases which are useful as catalysts here include quaternary ammonium hydroxides, such as trimethyl benzyl ammonium hydroxide; alkali and alkaline earth metals oxides, hydroxides, hydrides and carbonates as exemplified by potassium, potassium hydroxide, sodium hydride and potassium carbonate, potassium tertiary butoxide, butyl lithium, calcium oxide, barium oxide, etc. The amounts of strong basic catalysts to be used are preferably minute, as little as 0.01 of a mole percent can be used. When the donor is a polythiol a weak basic catalyst is recommended such as tributyl amine, N,N'-dimethylbenzyl amine, etc. The amount used in the latter case can be on the order of 0.1 of a mole percent based on the total number of moles of reactants. When the donor component is an amine, no catalyst is needed.

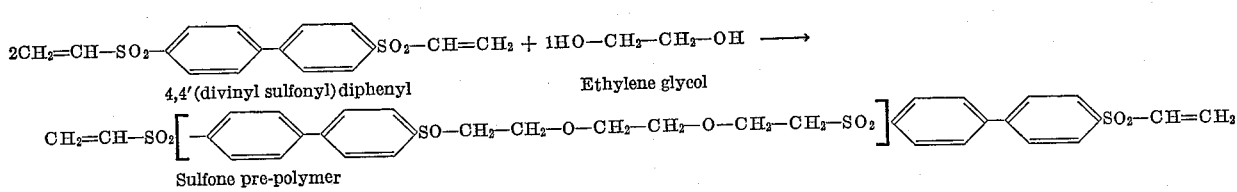

2CH$_2$=CH—SO$_2$— ... —SO$_2$—CH=CH$_2$ + 1HO—CH$_2$—CH$_2$—OH ⟶

4,4'(divinyl sulfonyl)diphenyl      Ethylene glycol

Sulfone pre-polymer

The pre-polymer formation reaction can be carried out at any convenient temperature and pressure. The reaction is exothermic and necessary precautions should be exercised. Heating can be carried out after the reaction is no longer exothermic in order to insure completion of reaction and expenditure of reactants. The reaction can be carried out in nonreactant solvents such as dioxane, acetone, chloroform, benzene, etc. or in mass. The pre-polymer can be retained in the solvent, the same is used or extracted from the same.

Additives and adducts can be used to stabilize the pre-polymer mixture, as for instance by addition of sufficient acid to neutralize the catalyst. Since the pre-polymer mixture contains free vinyl groups in the molecules thereof free radical inhibitors such as hydroquinone or tertiary butyl catechol can be used to advantage where cross-linking of the pre-polymer is to be postponed. It bears emphasis that the pre-polymer mixture to be effective for later cross-linking must contain free vinyl or more particularly free vinyl sulfone groups.

The pre-polymer mixture is made up of low molecular weight polymer molecules containing free vinyl sulfone groups. This gives a pre-polymer mixture which is either liquid in nature or easily dissolved in solvents such as water or organic solvents to give liquids, in either case having relatively low viscosities facilitating handling of the same preparatory to their being cross-linked. For this reason, they can be poured easily into molds, interstices, onto laminate substrates, etc., anticipatory to their being cross-linked into a permanent, hardened condition. Specifically, the pre-polymers should have molecular weights ranging from 300 to 5,000.

B. *Cross-linking step*

The sulfone pre-polymers consisting of a low molecular weight polymer and containing free vinyl sulfone groups in the polymer molecules thereof are cross-linked by reacting the same with an amine selected from the class consisting of primary and secondary amines having at least two amino hydrogens present on the same.

The primary amines are those containing two hydrogens for each amine nitrogen. Those preferred for use in the present case are those containing hydrocarbon residues. Specific examples of the amines include: n-amyl amine, tertiary butyl amine, n-octyl amine, aniline, 1,6-hexamethylene diamine, 1,4-bis-(aminomethyl)cyclohexane, meta-xylylene diamine, 1,3-propane diamine, paraphenylene diamine, 4,4'-diamino diphenyl sulfone, etc. The secondary amines contain a single hydrogen on an amino nitrogen. Examples of these include: piperazine, N,N'-diethyl propanediamine, N,N'-diethyl ethylenediamine, etc. It is also possible to use amines containing both a secondary and primary amine radical. Examples of these mixed amines include: diethylene triamine, tetraethylene pentamine, etc. The preferred amines are those which contain more than two amino hydrogens.

The amount of amine to be used in the cross-linking reaction ranges preferably 50–150% of the stoichiometric amount as determined by the number of vinyl sulfone groups contained in the pre-polymer molecules. In practice, more or less than this amount can be used, however, when less than 50% is used, the probability of having less than a desired amount of cross-linking taking place is extremely high. Amounts greater than 150% contribute less than a significant increase in cross-linking.

Generally speaking, the cross-linking reaction does not require the use of a catalyst. However, in the case of the aromatic amines, reactivity is enhanced by the inclusion of a small amount of acid catalyst such as acetic acid, formic acid, boron trifluoride. In this regard, generally the weaker acid catalysts are preferred while the stronger acids, such as hydrochloric acid, sulfuric acid, etc., though they can be used are less preferred. Incidental to this aspect, it bears cautioning that the use of acid catalysts with aliphatic amines has the opposite effect in that the acids act as polymerization retarders. Referring back to the case of the aromatic amines, the preferred acid catalyst is acetic acid, which can be expeditiously used in the amount of 20–100 percent of the equivalent weight of the amine used for cross-linking.

The cross-linking reaction will accommodate the inclusion of other materials such as solvents, emulsifiers, suspending agents, fillers, pigments and the like used to either facilitate this reaction or to body the reaction mixture.

The cross-linking steps can be practiced in a wide variety of manners and locations. The pre-polymer mixtures can be used directly as obtained from the formation reaction, or the pre-polymer molecules can be extracted from that reaction mixture and used, and in either case the pre-polymer can be dissolved, suspended or otherwise carried in a liquid or other medium, and in each case can be mixed with the amine and catalyst, if the latter is to be used. Once the ingredients are mixed, heat can be applied to initiate or facilitate the cross-linking reaction, however, in most cases it is not required to do so. Pressure as well as temperature can be used if desired during the cross-linking reaction.

As indicated, the location at which cross-linking reaction can be carried out is conducive to broad choice, accordingly conventional molds can be used when thermoset castings are to be made, also, material interstices, surfaces and interfaces when laminating and adhering activities are carried on.

The cross-linked sulfone polymers which eventuate from practice of the present invention have broad utility in application where qualities of thermosetting dimensional stability and solvent resistance are desired. These will include moldings, castings, films, fibers, etc.

The amine cross-linking sulfone polymers are particularly attractive in adhesive and laminating applications, where it is desired to have cross-linking, setting or curing take place within a comparatively short length of time. In this regard, certain of the cross-linking sulfone polymers can be cured to a solid state in a matter of minutes using room conditions. With the use of temperatures up to 150° C. curing times of a few seconds can be achieved.

In that the amine cross-linking sulfone polymers have a low dissipation factor, they can be used in electrical applications. They are particularly well adapted for encapsulation or potting of metallic inserts for electrical or electronic components. The good adhesion and low volume shrinkage evidenced by these polymers adds to their attractiveness as potting compounds.

It will thus be seen that the objects set forth above, among those made apparent from the preceding description, are efficiently attained and, since certain changes may be made in the above products and in carrying out the process by which they are obtained without departing from the scope of the invention, it is intended that all matter contained in the above description shall be interpreted as illustrative and not in a limiting sense.

What is claimed is:

1. A process for producing cross-linked sulfone polymers which process comprises the steps of (A) forming a cross-linkable pre-polymer mixture comprising sulfone polymer molecules of low molecular weight containing at least two vinyl sulfone groups in said molecules, by reacting a sulfone starting material selected from the class consisting of monosulfones represented by the formula:

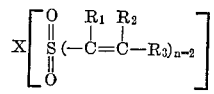

and polysulfones represented by the formula:

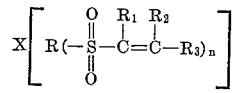

with less than a stoichiometric quantity of an active hydrogen-containing compound selected from the class consisting of polyhydric alcohols, polyhydric thiols and monosubstituted amines represented by the formula:

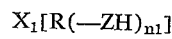

and amines represented by the formula:

$$X_1\left[R(-NH_2)_{\frac{n_1}{2}}\right]$$

and mixtures of the same, the said quantity being such that the ratio of $nX$ to $n_1X_1$ is greater than unity $$\left(\frac{nX}{n_1X_1}>1\right)$$

and wherein $n$ and $n_1$ represent integers of at least 2 and X and $X_1$ represent numbers of mols of each reactant and thereafter (B) cross-linking the said sulfone prepolymer mixture by reacting the same with 50–150 percent of the stoichiometric amount of an amine as determined by the number of vinyl sulfone groups contained in the pre-polymer mixture, said amine being selected from the class consisting of primary and secondary amines having at least two amino-hydrogens except that when the number of vinyl sulfone groups contained in the said pre-polymer is two in number, the amine must contain more than two amine hydrogens and wherein throughout both steps of the said process R is selected from the class consisting of organic radicals having a valence of 2–6 and free of reactive functional groups, $R_1$, $R_2$ and $R_3$ are selected from the class consisting of hydrogen, alkyl and aryl radicals, and Z is selected from the class consisting of monosubstituted nitrogen, oxygen and sulfur.

2. The process according to claim 1 wherein the starting material is divinyl sulfone.

3. The process according to claim wherein the active hydrogen-containing compound is a primary amine.

4. A process for providing a cross-linked sulfone polymer which comprises the steps of reacting divinyl sulfone with less than a stoichiometric quantity of 1,2,6-hexanetriol to produce a prepolymer having more than two vinyl sulfone groups in the molecule of same, and, cross-linking the said pre-polymer by reacting the same with p-phenylene diamine.

5. A process for providing a cross-linked sulfone polymer which comprises the steps of reacting divinyl sulfone with less than a stoichiometric quantity of 1,4-butanediol to produce a pre-polymer having two vinyl sulfone groups in the molecule of same, and, cross-linking the said pre-polymer by reacting the same with 1,6-hexamethylene diamine.

6. A process for providing a cross-linked sulfone polymer which comprises the steps of reacting divinyl sulfone with less than a stoichiometric quantity of diethylene glycol and glycerin to produce a pre-polymer having three vinyl sulfone groups in the molecule of same and cross-linking the said pre-polymer by reacting the same with diethylene triamine.

7. A process for providing a cross-linked sulfone polymer which comprises the steps of reacting divinyl sulfone with less than a stoichiometric quantity of piperazine to produce a prepolymer having two vinyl sulfone groups in the molecule of the same, and, cross-linking the said pre-polymer by reacting the same with 1,4-bis(aminoethyl)cyclohexane.

8. A process for providing a cross-linked sulfone polymer which comprises the steps of reacting 4,4′-di(vinyl sulfonyl)diphenyl with less than a stoichiometric quantity of triethylene glycol to produce a pre-polymer having two vinyl sulfone groups in the molecule of the same, and, cross-linking the said pre-polymer by reacting the same with 1,4-bis(aminomethyl)cyclohexane.

9. A cross-linked polymer produced by the process which comprises the steps of (A) forming a cross-linkable pre-polymer mixture comprising sulfone polymer molecules of low molecular weight retaining at least two vinyl sulfone groups in said molecules, by reacting a sulfone starting material selected from the class consisting of monosulfones represented by the formula:

$$X\left[\begin{array}{c}O\phantom{xxx}R_1\phantom{x}R_2\\ \|\phantom{xxx}|\phantom{x}|\\ S(-C=C-R_3)_{n-2}\\ \|\\ O\end{array}\right]$$

and polysulfones represented by the formula:

$$X\left[\begin{array}{c}\phantom{xx}O\phantom{x}R_1\phantom{x}R_2\\ \phantom{xx}\|\phantom{x}|\phantom{x}|\\ R(-S-C=C-R_3)_n\\ \phantom{xx}\|\\ \phantom{xx}O\end{array}\right]$$

with less than a stoichiometric quantity of an active hydrogen-containing compounds selected from the class consisting of polyhydric alcohols, polyhydric thiols and monosubstituted amines represented by the formula:

$$X_1[R(-ZH)_{n_1}]$$

and amines represented by the formula:

$$X_1\left[R(-NH_2)_{\frac{n_1}{2}}\right]$$

and mixtures of the same, the said quantity being such that the ratio of $n.X$ to $n_1X_1$ is greater than unity $$\left(\frac{nX}{n_1X_1}>1\right)$$

and wherein $n$ and $n_1$ represent integers of at least 2 and X and $X_1$ represent numbers of moles of each reactant and thereafter (B) cross-linking the said sulfone prepolymer mixture by reacting the same with 50–150 percent of the stoichiometric amount of an amine as determined by the number of vinyl sulfone groups contained in the pre-polymer mixture, said amine being selected from the class consisting of primary and secondary amines having at least two amino hydrogens except that when the number of vinyl sulfone groups retained in the said pre-polymer are two in number, the amine must contain more than two amino hydrogens and wherein throughout both steps of the said process R is selected from the class consisting of organic radicals having a valence of 2–6 and free of reactive functional groups, $R_1$, $R_2$ and $R_3$ are selected from the class consisting of hydrogen, alkyl and aryl radicals, and Z is selected from the class consisting of monosubstituted nitrogen, oxygen and sulfur.

10. The process according to claim 1 wherein the active hydrogen containing compound is a polyhydric alcohol.

References Cited by the Examiner
UNITED STATES PATENTS

| | | | |
|---|---|---|---|
| 2,623,035 | 12/1952 | Schappel | 260—79.3 |
| 3,031,435 | 4/1962 | Tesoro | 260—79.3 |
| 3,138,573 | 6/1964 | Le Fave et al. | 260—79.3 |

FOREIGN PATENTS 650,742  2/1951  Great Britain.

JOSEPH L. SCHOFER, *Primary Examiner.*

H. N. BURSTEIN, J. R. LIBERMAN, JAMES A. SEIDLECK, *Examiners.*

UNITED STATES PATENT OFFICE
CERTIFICATE OF CORRECTION

Patent No. 3,220,984                          November 30, 1965

Irving Tashlick et al.

It is hereby certified that error appears in the above numbered patent requiring correction and that the said Letters Patent should read as corrected below.

In the grant, line 2, after "California," insert -- assignors to Monsanto Company, a corporation of Delaware, --; line 11, for "Irving Tashlick and Harry M. Culbertson, their heirs" read -- Monsanto Company, its successors --; in the heading to the printed specification, lines 4 to 6, for "Irving Tashlick, 1310 Bay St., Springfield, Mass., and Harry M. Culbertson, 18571 Blythswood Drive, Los Gatos, Calif." read -- Irving Tashlick, Springfield, Mass., and Harry M. Culbertson, Los Gatos, Calif., assignors to Monsanto Company, a corporation of Delaware --; column 2, lines 11 to 14, the formula should appear as shown below instead of as in the patent:

$$X_1[R(-ZH)_{n1}]$$

same column 2, line 18, for "quantiyt" read -- quantity --.

Signed and sealed this 13th day of December 1966.

(SEAL)
Attest:

ERNEST W. SWIDER                          EDWARD J. BRENNER
Attesting Officer                          Commissioner of Patents